US009517965B2

United States Patent
Sun et al.

(10) Patent No.: US 9,517,965 B2
(45) Date of Patent: Dec. 13, 2016

(54) METHOD FOR PREPARING A SODA-LIME-SILICA GLASS BASIC FORMULATION AND A METHOD FOR EXTRACTING ALUMINUM FROM COAL ASH FOR CO-PRODUCTION OF GLASS

(71) Applicants: Shenhua Group Corporation Limited, Dongcheng District, Beijing (CN); National Institute of Clean-and-Low-Carbon Energy, Changping District, Beijing (CN)

(72) Inventors: Qi Sun, Beijing (CN); Lijun Zhao, Beijing (CN); Baodong Wang, Beijing (CN); Xiaoting Liu, Beijing (CN)

(73) Assignees: National Institute of Clean-and-Low-Carbon Energy, Beijing (CN); Shenhua Group Corporation Limited, Beijing (CN)

( * ) Notice: Subject to any disclaimer, the term of this patent is extended or adjusted under 35 U.S.C. 154(b) by 0 days.

(21) Appl. No.: 14/647,739

(22) PCT Filed: Nov. 27, 2012

(86) PCT No.: PCT/CN2012/085351
§ 371 (c)(1),
(2) Date: May 27, 2015

(87) PCT Pub. No.: WO2014/082205
PCT Pub. Date: Jun. 5, 2014

(65) Prior Publication Data
US 2015/0321946 A1  Nov. 12, 2015

(51) Int. Cl.
*C03B 5/00* (2006.01)
*C03C 1/00* (2006.01)
(Continued)

(52) U.S. Cl.
CPC .............. *C03C 1/002* (2013.01); *C03C 1/006* (2013.01); *C03C 3/062* (2013.01); *C03C 3/087* (2013.01); *C03C 3/097* (2013.01)

(58) Field of Classification Search
CPC ................................. C03B 5/005; C03C 1/002
(Continued)

(56) References Cited

U.S. PATENT DOCUMENTS 3,573,887 A * 4/1971 Caldwell et al. ......... C03B 1/00
501/27
3,726,697 A * 4/1973 Mod et al. .............. C03C 1/026
264/117
(Continued)

FOREIGN PATENT DOCUMENTS

| CN | 1095689 A | 11/1994 |
| CN | 1281820 A | 1/2001 |

(Continued)

OTHER PUBLICATIONS

English Language Abstract, CN101591020A, 2 pages.
(Continued)

*Primary Examiner* — Noah Wiese
(74) *Attorney, Agent, or Firm* — Senniger Powers LLP

(57) ABSTRACT

The present invention discloses a method for preparing a soda-lime-silica glass basic formulation and a method for producing soda-lime-silica glass, comprising the steps of: pre-desiliconizing silicon-containing powdery industrial waste with a sodium hydroxide solution; introducing carbon dioxide for carbonation decomposition, and filtering to obtain a silicic acid precipitate and a sodium carbonate solution; drying the silicic acid precipitate to obtain silicon dioxide; adding lime milk into the filtered sodium carbonate for causticization, and filtering to obtain a sodium hydroxide solution and a calcium carbonate precipitate; drying the calcium carbonate precipitate; using said silicon dioxide and part of the calcium carbonate and adding sodium oxide. The present invention further discloses a method for extracting aluminum from coal ash for co-production of soda lime glass, which uses silicon dioxide obtained from alkali dissolution and desiliconization of coal ash and calcium car-
(Continued)

bonate generated from causticization as main raw materials. The method for extracting aluminum from coal ash for co-production of soda lime glass according to the present invention integrates and optimizes a process of extracting aluminum from the coal ash, has a high material and energy utilization rate, good quality of co-product glass, and high added value, and can greatly improve economical efficiency of aluminum extraction of coal ash.

21 Claims, 1 Drawing Sheet

(51) Int. Cl.
    *C03C 3/087*    (2006.01)
    *C03C 3/062*    (2006.01)
    *C03C 3/097*    (2006.01)

(58) Field of Classification Search
    USPC ........................................................ 501/134.8
    See application file for complete search history.

(56) References Cited

U.S. PATENT DOCUMENTS

| | | | |
|---|---|---|---|
| 3,969,122 A | | 7/1976 | Miller et al. |
| 4,191,546 A | * | 3/1980 | Kroyer ............... B09B 3/005 501/39 |
| 5,203,901 A | * | 4/1993 | Suzuki ................ C03C 1/002 501/155 |
| 6,145,343 A | * | 11/2000 | Jantzen ............... C03C 1/002 65/134.3 |

FOREIGN PATENT DOCUMENTS

| | | | | |
|---|---|---|---|---|
| CN | 1644506 A | | 7/2005 | |
| CN | 1792802 A | | 6/2006 | |
| CN | 1923695 A | | 3/2007 | |
| CN | 101125656 A | | 2/2008 | |
| CN | 101200298 A | | 6/2008 | |
| CN | 101235295 A | | 8/2008 | |
| CN | 101284668 A | | 10/2008 | |
| CN | 101333074 A | | 12/2008 | |
| CN | 100491247 C | | 5/2009 | |
| CN | 101575112 A | | 11/2009 | |
| CN | 101591020 A | | 12/2009 | |
| CN | 101591020 A | * | 12/2009 | ............. C01B 33/12 |
| CN | 101028936 B | | 11/2010 | |
| CN | 101966999 A | | 2/2011 | |
| CN | 102020303 A | | 4/2011 | |
| CN | 102101686 A | | 6/2011 | |
| CN | 102101688 A | | 6/2011 | |
| CN | 102107895 A | | 6/2011 | |
| CN | 103819086 A | | 5/2014 | |
| EP | 1313674 B1 | | 6/2004 | |

OTHER PUBLICATIONS

English Language Abstract, CN1644506A, 1 page.
English Language Abstract CN102101688A, 2 pages.
English Language Abstract CN 10210686A, 2 pages.

* cited by examiner

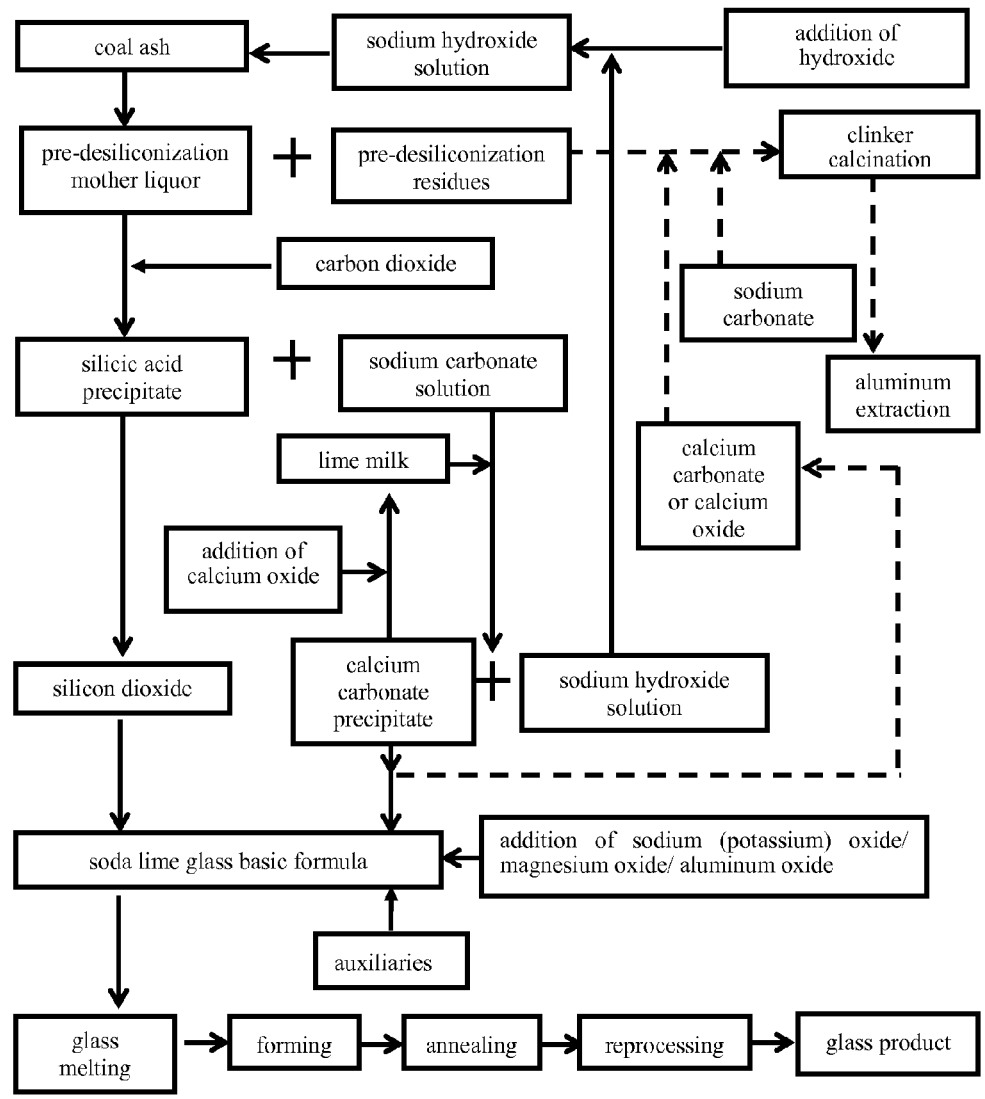

METHOD FOR PREPARING A SODA-LIME-SILICA GLASS BASIC FORMULATION AND A METHOD FOR EXTRACTING ALUMINUM FROM COAL ASH FOR CO-PRODUCTION OF GLASS

REFERENCE TO CORRESPONDING APPLICATIONS

This application is the 371 National Stage Application based on International PCT Application No. PCT/CN2012/085351, filed Nov. 27, 2012.

FIELD OF THE INVENTION

This invention relates to a method for preparing a soda-lime-silica glass basic formulation and a method for production of soda-lime-silica glass, in particular, a method for producing soda lime glass with silicon-containing powdery industrial waste such as coal ash, as well as a method for extracting aluminum from coal ash for co-production of soda lime glass.

BACKGROUND ART

Soda-lime-silica glass is mostly widely used, mainly for production of flat glass and various glass products. The output of flat glass in China is about 0.74 billion weight case, in the order of 37 million tons. It can be determined according to a $Na_2O$-$CaO$-$SiO_2$ system phase diagram that the composition range that can form glass is, in % by weight, 12~18wt % of $Na_2O$, 6~16wt % of $CaO$, and 68~82wt % of $SiO_2$. The composition of common glass is, in % by weight, 12~15wt % of $Na_2O$, 8~13wt % of $CaO$, and 69~73wt % of $SiO_2$. In such glass of ternary system, two types of composition of precipitated crystal can be easily formed, i.e. devitrite ($Na_2O.CaO.SiO_2$) and wollastonite ($CaO.SiO_2$). It was found in production practice that the introduction of $MgO$ (which may partially replace $CaO$) and $Al_2O_3$ not only improves crystallizability of the glass, but also increases thermal stability and chemical stability. Moreover, partial replacement of $Na_2O$ with $K_2O$ has "double alkali effect", and can improve chemical stability and luster of the glass. Except for high-alumina glass, the amount of $Al_2O_3$ is generally not exceeding 10 wt %, usually between 0.5 and 3 wt %, As is well known, coal ash is a common high-silicon powdery industrial waste, which is discharged from chimneys and furnace bottoms of coal-fired power plants after finely ground coal powder was burnt in the furnaces. China is rich in coal resources. In recent years, the annual consumption of thermal coal has reached above 1.7 billion tons, while the annual output of coal ash has exceeded 0.4 billion tons. In the previous studies, to make maximum use of respective components of coal ash, coal ash was usually used directly as raw material for production of foam glass and microcrystal glass (Xiaoping FENG: Application of Coal ash in Glass Industry, Coal Ash, 2004, 3, 24-26). However, a modest usage amount of these two glasses restricts a further development of glass manufactured with coal ash. Due to scarcity of bauxite resources in China, and the amount of aluminum oxide generally takes up 16.5 to 35.4 wt % of coal ash, or up to above 50 wt %, thus, the research and development of the process for extracting aluminum from coal ash has been attached great importance, mainly including the acid process, alkali process, acid and alkali combination method, ammonium sulfate process, etc., among which, the soda lime sintering process based on pre-desiliconization can produce byproducts such as white carbon black, dicalcium silicate, calcium silicate, which is conducive to improving economical efficiency of extracting aluminum from coal ash.

The method for preparing a soda-lime-silica glass basic formulation, the method for producing soda-lime-silica glass, as well as the process of extracting aluminum from coal ash for co-production of glass as presented by this invention break through the routine process for manufacturing glass, by utilizing silicon-containing powdery industrial waste such as coal ash, and using silicon dioxide obtained from alkali dissolution and desiliconization of an alkaline solution and calcium carbonate resulting from caustification as principal raw materials, which not only produce common glass which is in great demand, but also produce high value-added ultra-white glass. By treating coal ash with an alkaline solution, the present invention enables the glass phase with higher reactivity, which is mainly composed of silicon dioxide, to react with a sodium hydroxide solution, to give a pre-desiliconization mother liquor mainly consisting of sodium silicate, and a few amount of sodium aluminate. After carbonation decomposition, the pre-desiliconization mother liquor is separated to obtain a silicic acid precipitate and a sodium carbonate solution. The silicic acid precipitate is dried to obtain silicon dioxide, which may serve as silicon source and aluminum source for production of soda-lime-silica glass. Moreover, lime milk is added into a sodium carbonate solution for causticization to obtain a calcium carbonate precipitate and a caustic alkali solution. The dried calcium carbonate precipitate can serve as calcium source for production of soda-lime-silica glass. Sodium carbonate and sodium hydroxide are entrained in silicon dioxide and calcium carbonate, and can serve as part of the sodium source for production of soda-lime-silica glass.

Compared to the traditional process for producing soda-lime-silica glass, the process for producing soda lime glass presented by this invention integrates and optimizes a process of extracting aluminum from the coal ash, realizes comprehensive use of solid waste, has a high material and energy utilization rate and a good product quality, and can greatly improve economical efficiency of extracting aluminum from coal ash.

SUMMARY OF THE INVENTION

According to a first aspect of this invention, provided is a method for preparing a soda-lime-silica glass basic formulation, comprising steps of:

a1) pre-desiliconizing silicon-containing powdery industrial waste with a sodium hydroxide solution, and separating, to obtain a pre-desiliconization mother liquor and residues;

a2) introducing carbon dioxide to the pre-desiliconization mother liquor for carbonation decomposition, and separating, to obtain a silicic acid precipitate and a sodium carbonate solution;

a3) drying the silicic acid precipitate to obtain silicon dioxide;

a4) adding lime milk into the sodium carbonate solution for causticization, and separating, to obtain a calcium carbonate precipitate and a sodium hydroxide solution;

a5) drying the calcium carbonate precipitate; and a6) according to the requirements on the amounts of respective components in the soda-lime-silica glass, using the silicon dioxide prepared in step a3) and part of the dried calcium carbonate from step a5), and adding sodium oxide, to obtain a soda-lime-silica glass basic formulation.

In the above method, said silicon-containing powdery industrial waste is selected from a group consisting of one or more of pulverized or unpulverized coal ash, stove ash, clay, kaolin, slag and red mud.

Preferably, the method for producing soda-lime-silica glass according to the invention may further comprise at least one of the following steps:

a1-1) subjecting the silicon-containing powdery industrial waste to magnetic separation for removing iron prior to the step a1) of pre-desiliconization;

a4-1) recovering the sodium hydroxide solution obtained from step a), to allow its use in the pre-desiliconization of the silicon-containing powdery industrial waste in step a1);

a5-1) calcining part of the dried calcium carbonate precipitate from step a5) and preparing lime milk, to allow the addition of the lime milk to the filtered sodium carbonate for causticization in step a4); and a5-2) recovering carbon dioxide obtained by calcining the calcium carbonate precipitate, to allow its use in the carbonation decomposition in step a2).

In the above method, said silicon-containing powdery industrial waste is preferably coal ash.

In step a4-1), due to the loss of sodium hydroxide caused by sodium carbonate (which is equivalent to sodium hydroxide after causticization) entrained in the silicic acid precipitate in step a2) and sodium hydroxide entrained in the calcium carbonate precipitate in step a4), some sodium hydroxide may be supplemented as needed so as to meet the need for sodium hydroxide in step a1).

In step a1), preferably, the mass concentration of sodium hydroxide in the solution is 10% to 50%, preferably 15 to 35%, the mass ratio of coal ash to sodium hydroxide is 100:15 to 150, preferably 100:30 to 90, the reaction temperature is between 50° C. and 150° C., preferably between 70° C. and 130° C., and the reaction time lasts for 0.5 h to 10 h, preferably 1h to 4h. The $SiO_2/Al_2O_3$ mass ratio in the resulting pre-desiliconization mother liquor is generally greater than 6. Instead of pursuing a too high mass ratio, a mass ratio between 30 and 150 is preferred. A proper mass ration is conducive to obtaining of the best glass formulation.

In step a2), carbon dioxide can be obtained by calcining the calcium carbonate precipitate, or may be purchased. The volume concentration of carbon dioxide in the gas resulting from the calcination shall be over 10%, and impurities in the purchased carbon dioxide shall not impact the carbonation decomposition process. Thus, preferably, the method for producing soda lime glass by using coal ash according to this invention further comprises a step of recycling carbon dioxide obtained by calcining the calcium carbonate precipitate to step a2) for carbonation decomposition. Meanwhile, pH of the solution at the end of carbonation decomposition is required to be at least below 11, preferably below 9, between 8 and 9, for completion of precipitation.

In step a3), it is unnecessary to repeatedly wash the silicic acid precipitate for preparation of high-purity silicon dioxide. After drying, the sodium carbonate solution entrained in the precipitate may serve as raw material component for soda lime glass.

In step a4), it is unnecessary to repeatedly wash the calcium carbonate precipitate for preparation of high-purity calcium carbonate. After drying, the sodium hydroxide solution entrained in the precipitate may serve as raw material component for soda lime glass.

As for the calcium carbonate precipitate dried in step a5), part of it may be used as raw material of step a6). Besides, it can be further subjected to other treatment and application. For example, it may be recycled to step a4) after calcined and prepared into lime milk, or may be used directly as raw material of the process of soda lime sintering and aluminum extraction of the coal ash, or may be used after calcination as raw material of the process of soda lime sintering and aluminum extraction of the coal ash. The specific use in the implementing process can be determined according to the material balance and economic efficiency of the process. For instance, either one or a combination of the following two schemes may be adopted: (1) recycling part or all of the remaining calcium carbonate precipitate to step a4) after calcination for preparation of lime milk; (2) using part or all of the remaining calcium carbonate precipitate directly as raw material of the process of soda lime sintering and aluminum extraction of the coal ash, or using after calcination as raw material of the process of soda lime sintering and aluminum extraction of the coal ash.

In step a6), silicon dioxide and the calcium carbonate precipitate (including further useful components for glass) obtained respectively in step a3) and a5) amount to 70 to 95% by weight of the basic formulation of the silicate glass. However, to meet the demand of the soda lime glass formulation, relevant substances aside from the above major components need to be added, such as sodium (potassium) oxide/ magnesium oxide and relevant auxiliaries. The corresponding addition amount and type of substance may vary with ingredients of the carbon dioxide and calcium carbonate precipitate obtained according to the method of the present invention, glass process conditions and uses of the glass. Generally, the composition range of the soda lime glass is, in percentage by weight: 12-18% $Na_2O$, 6-16% $CaO$ and 68-82% $SiO_2$, preferably, 12-15% $Na_2O$, 8-13% $CaO$ and 69-73% $SiO_2$, the balance being potassium oxide or aluminum oxide or magnesia and related auxiliaries.

According to a second aspect of the invention, provided is a method for producing soda-lime-silica glass. According to the soda-lime-silica glass basic formulation of the invention, said method comprises the steps of:

a7) adding potassium oxide and/or aluminum oxide and/or magnesium oxide, and/or auxiliaries according to the requirements on the amounts of respective components of the soda-lime-silica glass; and a8) performing glass melting, forming, and annealing.

Moreover, in the above method for producing soda-lime-silica glass, reprocessing may be conductede as required to give glass products.

In step a7), said relevant auxiliaries are auxiliaries commonly used in conventional glass manufacturing, such as one or more of the group consisting of clarifying agent, oxidant, reducing agent, colorant, decolorant, emulsifier, cosolvent and the like. Said clarifying agent is, for example, arsenic trioxide, antimonous oxide, nitrate, sulfate, fluoride, ceria, and ammonium salt, etc; said oxidant is, for example, nitrate, arsenic trioxide, and ceria, etc; said reducing agent is, for example, carbon, potassium tartrate, tin powder and compounds thereof, metal aluminum powder and metal antimony powder, etc; said colorant is, for example, compounds of transition metal elements and rare-earth metal elements, etc; said decolorant is, for example sodium nitrate, potassium nitrate, antimonous oxide, ceria, and manganese oxide, etc; said emulsifier is, for example, fluoride, phosphate, sulfate, and chloride, etc; said cosolvent is, for example, fluoride, boride, barium compound, and nitrate, etc. As aforementioned, a single compound may serve as multiple auxiliaries, such as nitrate and sulfate, during the melting process of glass. Meanwhile, doses of a single auxiliary of different types may vary greatly during the melting process of glass, generally from 0.01wt % to 6-7wt %, which shall be determined according to the process conditions and use.

The method of production of soda-lime-silica glass in step a8) is a conventional and mature process in the art. The melting process of glass may be described in the following stages: firstly, mixing all the raw materials uniformly, and then heating to 800° C. to 1000° C. to generate silicate; secondly, heating the above silicate to 1200° C. to 1300° C. to form molten glass; thirdly, heating the above molten glass to 1400° C. to 1500° C. for clarification; fourthly, performing homogenization of the molten glass, which may be performed at a temperature of 100° C. and 200° C. below the clarification temperature of the molten glass; fifthly, finally, lowering the temperature of the molten glass uniformly to 1000° C. to 1300° C. for cooling, to reach a viscosity required by the forming. In the practical melting process, the above stages usually proceed simultaneously or staggerly, which mainly relies upon the process system of melting and characteristics of the structure of glass melting kiln. For example, in float glass production, formulation materials are directly fed to a pool at a temperature about 1300° C., in which silicate is formed extremely rapidly, and the formation of molten glass depends on complete dissolution of quartz. It is difficult to completely partition these two processes, so that they are generally known as the formulation materials melting stage.

The forming process in this invention, according to different uses of glass articles, can adopt various processes commonly used in production, for example, a pressing process, a blowing process, a drawing process, a rolling process, casting forming or float forming, etc. Float forming and rolling process are preferred for the production of soda lime flat glass. Meanwhile, in avoidance of cracking caused by rapid cooling, the molded glass is generally preserved under the annealing temperature for a period of time, followed by lowering the temperature according to the cooling temperature profile to a certain temperature, and cutting off the power to stop heating, allowing it to slowly and naturally cool with the furnace to below 100° C., removing the glass out of the furnace, and cooling it in the air to room temperature. If the annealed glass fails to pass the stress examination, then it has to be subjected to annealing again to prevent from cracking under processing.

Generally, only a few of the formed glasses can meet the user's needs, while most of them shall be subjected to reprocessing to satisfy the requirements for glass articles. Glass reprocessing is generally classified into three categories as of cold working (cutting, grinding, polishing, etc), hot working and surface treatment. Moreover, glass reprocessing also includes glass sealing as well as strengthening processing (thermal tempering and chemical strengthening), etc.

In particular, according to the method for production of soda lime glass with coal ash provided by this invention, since silicon dioxide and the calcium carbonate precipitate, as the major materials for glass, do not contain coloring matters such as iron, thus they do not impose much demand for decoloration in the manufacturing process of glass, and particularly suitable for the manufacture of ultra-white glass with high added value.

According to a third aspect of the invention, provided is a method for extracting aluminum from coal ash for co-production of glass, comprising the steps of:
  b1) pre-desiliconizing coal ash with a sodium hydroxide solution, and separating, to obtain a pre-desiliconization mother liquor and residues;
  b2) introducing carbon dioxide to the pre-desiliconization mother liquor for carbonation decomposition, and separating, to obtain a silicic acid precipitate and a sodium carbonate solution;
  b3) drying the silicic acid precipitate to obtain silicon dioxide;
  b4) adding lime milk into the sodium carbonate solution for causticization, and separating, to obtain a calcium carbonate precipitate and a sodium hydroxide solution;
  b5) drying the calcium carbonate precipitate;
  b6) according to the requirements on the amounts of respective components in the soda-lime-silica glass, using the silicon dioxide prepared in step b3) and part of the dried calcium carbonate from step b5), and adding sodium oxide, to obtain a soda-lime-silica glass basic formulation; and
  b7) performing aluminum extraction by using the resulting residues obtained from step b1).

Preferably, the method for extracting aluminum from coal ash for co-production of glass according to the invention may further comprise:
  b8) adding potassium oxide and/or aluminum oxide and/or magnesium oxide, and/or auxiliaries according to the requirements on the amounts of respective components of the soda-lime-silica glass; and
  b9) performing glass melting, forming, annealing, and reprocessing to obtain a glass product.

Also preferably, the method for extracting aluminum from coal ash for co-production of glass according to the invention may further comprise at least one of the following steps:
  b1-1) subjecting the silicon-containing powdery industrial waste to magnetic separation for removing iron prior to the step b1) of pre-desiliconization;
  b4-1) recovering the sodium hydroxide solution obtained in step b4), to allow its use in the pre-desiliconization of the silicon-containing powdery industrial waste in step b1);
  b5-1) calcining part of the dried calcium carbonate precipitate from step b5) and preparing lime milk, to allow the addition of the lime milk to the filtered sodium carbonate for causticization in step b4); and
  b5-2) recovering carbon dioxide obtained by calcining calcium carbonate precipitate, to allow its use in the carbonation decomposition in step b2).

In the step b1), preferably, the mass concentration of sodium hydroxide in the solution is 10% to 50%, the mass ratio of coal ash to sodium hydroxide is 100:15 to 150, the reaction temperature is between 60° C. and 150° C., and the reaction time period is in the range of from 0.5 h to 10 h. More preferably, the mass concentration of sodium hydroxide in the solution is 15% to 35%, the mass ratio of coal ash to sodium hydroxide is 100:30 to 90, the reaction temperature is between 70° C. and 130° C., and the reaction time period is in the range of from 1h to 4h.

In the method for extracting aluminum from coal ash for co-production of glass according to the invention, as for the treatment and utility method of the dried calcium carbonate precipitate from step b5), reference can be made to the description of the method for production of glasses in the above first aspect.

Preferably, the method for extracting aluminum from coal ash for co-production of glass according to the invention further comprises a step of recycling the sodium hydroxide solution obtained in step b4) to step b1) for pre-desiliconizing the coal ash. In said step, in view of the loss of sodium hydroxide caused by sodium carbonate (which is equivalent to sodium hydroxide after causticization) entrained in the silicic acid precipitate in step b2) and sodium hydroxide entrained in the calcium carbonate precipitate in step b4), some sodium hydroxide may be supplemented as needed so as to meet the need for sodium hydroxide in step b1).

In step b7 of the method for extracting aluminum from coal ash for co-production of glass according to this invention, the process for extracting aluminum is not specifically restricted, and thus aluminum extraction can be carried out via various processes, for example, an acid process, alkali process, acid and alkali combination method, ammonium sulfate process, etc. The acid process is, for example, leaching aluminum from the residues resulting from step b1) with hydrochloric acid or sulfuric acid, such as the relevant processes disclosed in Chinese patent applications 94100813.4, 200510048274.9, 200610048295.5, 20071001299.2, 200810011311.2, 201010601142.5, 201010601190.4, 201010601611.3 and 201010103782.8.

All the contents of these patent applications are introduced to this text by reference. Aluminum extraction with alkali can be carried out by various processes adopted in the art, such as Bayer process, lime sintering, etc., for example, relevant methods disclosed in Chinese patent applications 200410090949.1, 200710150915.0, 200710017304.9, 200710061662.X and 200710062534.7. All the contents of these patent applications are introduced to this text by reference.

Preferably, in step b7of the method for extracting aluminum from coal ash for co-production of glass according to this invention, the remaining calcium carbonate precipitate from step b5) is directly mixed with the residues obtained from step b1); alternatively, the remaining calcium carbonate precipitate from step b5) may be calcined at first to obtain lime and then mixed with the residues obtained in step b1), for preparing clinker by soda lime sintering, so as to carry out aluminum extraction. The calcium carbonate precipitate and the residues are mixed, or the lime and the residues are mixed, according to a molar ratio of $[CaO]/([SiO_2]+x[TiO_2])$ between 0.8 and 2.2, wherein $0.5<x<1.0$, preferably, according to a molar ratio of $[CaO]/([SiO_2]+[TiO_2])$ between 0.9 and 1.1, or to a molar ratio of $[CaO]/([SiO_2]+0.5[TiO_2])$ between 1.9 and 2.1. Meanwhile, sodium carbonate is supplied with an amount according to a molar ratio of $[Na_2O]/([Al_2O_3]+[Fe_2O_3]+y[SiO_2])$ between 0.8 and 1.2, wherein $0<y<1.0$, preferably, according to a molar ratio of $[Na_2O]/([Al_2O_3]+[Fe_2O_3])$ between 0.9 and 1.1, or to a molar ratio of $([Al_2O_3]+[Fe_2O_3]+[SiO_2])$ between 0.9 and 1.1. The process of preparing clinker by soda lime sintering is carried out under a temperature between 800 and 1500° C., preferably, between 1000 and 1300° C.

According to a fourth aspect of this invention, provided is a soda lime glass article, which is prepared by the method for producing glass according to the first or second aspect as mentioned hereinabove.

BRIEF DESCRIPTION OF THE DRAWINGS

FIG. 1 is a process flow scheme of a preferred embodiment of extracting aluminum from coal ash for co-production of glass according to this invention.

SPECIFIC EMBODIMENTS

FIG. 1 shows a flow scheme of a preferred embodiment of extracting aluminum from coal ash for co-production of glass according to this invention. Coal ash was treated with an alkali liquor, and separated to obtain a pre-desiliconization mother liquor and pre-desiliconization residues. Carbon dioxide was introduced to the pre-desiliconization mother liquor for carbonation decomposition, and separation was performed to obtain a silicic acid precipitate and a sodium carbonate solution. The silicic acid precipitate was further dried to give silicon dioxide, which served directly as raw material for soda lime glass. Lime milk was added into the sodium carbonate solution for causticization, and separation was performed to obtain a calcium carbonate precipitate and a caustic soda solution. Part of the calcium carbonate precipitate could be used directly as raw material for soda lime glass. The remaining calcium carbonate may be recycled after calcined, supplemented with calcium oxide and prepared into lime milk; alternatively, the remaining calcium carbonate may be subjected to calcination together with the pre-desiliconization residues, directly or after calcined, to prepare clinker for aluminum extraction, which corresponds to the dotted portion in the figure. The caustic soda solution could be recycled after supplemented with sodium hydroxide and water, for pre-desiliconization of the coal ash. A further addition of sodium (potassium) oxide/magnesium oxide may result in a soda lime glass formulation mainly consisting of silicon dioxide, calcium oxide and sodium oxide. Thereafter, a glass product was finally obtained upon the melting, forming, annealing and reprocessing process.

This invention is further illustrated hereinbelow, however, the following examples are merely intended to assist a person skilled in the art to better understand the principles and essences of this invention, and by no means to set any limitation on this invention.

A type of coal ash from a power plant in Zhunger region of Inner Mongolia was subjected to chemical composition analysis (percentage by weight), and the results thereof were shown in Table 1, wherein the amount of $Al_2O_3$ is as high as 50.71%, and the amount of $SiO_2$ is as high as 40.01%. Hence, it is a typical high-aluminum coal ash, an ideal raw material for producing glass and extracting aluminum.

TABLE 1

| $SiO_2$ | $Al_2O_3$ | $Fe_2O_3$ | FeO | MgO | CaO | $Na_2O$ | $K_2O$ | $H_2O$ | $TiO_2$ | $P_2O_5$ | MnO | Ignition loss | S | Total amount |
|---|---|---|---|---|---|---|---|---|---|---|---|---|---|---|
| 40.01 | 50.71 | 1.41 | 0.35 | 0.47 | 2.85 | 0.12 | 0.5 | 0.024 | 1.57 | 0.17 | 0.022 | 1.41 | 0.22 | 99.81 |

Example 1

1000 g coal ash with above composition were reacted for 3 h under stirring under the condition of: a NaOH solution concentration of 20%, a mass ratio of ash to alkali of 1:0.6, and a reaction temperature of 120° C. Upon filtering and washing, a pre-desiliconization mother liquor and coal ash residues were obtained. The pre-desiliconization mother liquor mainly consisted of sodium silicate and sodium aluminate, and had a mass ratio of $SiO_2/Al_2O_3$ of 65.23. The pre-desiliconized coal ash residues, which were subjected to hot-air drying under a temperature to of 120° C. for 3h, weighed 820.5g, the chemical composition of which was shown in Table 2 (wt %). Thus, the amount of $Al_2O_3$ in the coal ash residues increased from 50.71% to 60.13%, the mass ratio of $Al_2O_3/SiO_2$ increased from 1.27 to 2.25, and the extraction rate of $SiO_2$ was 42.5%.

air to room temperature to accomplish annealing. Thereafter, the flat glass was cut into a shape suitable for processing and experimental measurement, and subjected to grinding (emery) and polishing (ceria) treatment.

Based on the special process of pre-desiliconization of coal ash, the formulation materials of the glass did not contain iron and nickel. Nickel was not detected from the fire-formed glass, while the amount of iron was 53 ppm, which met and surpassed the standard of ultra-white glass (containing less than 150 ppm of iron), and the visible light

TABLE 2

| $SiO_2$ | $Al_2O_3$ | $Fe_2O_3$ | FeO | MgO | CaO | $Na_2O$ | $K_2O$ | $H_2O$ | $TiO_2$ | $P_2O_5$ | MnO | Ignition loss | S | Total amount |
|---|---|---|---|---|---|---|---|---|---|---|---|---|---|---|
| 26.81 | 60.13 | 1.81 | 0.41 | 0.55 | 3.31 | 0.95 | 0.6 | 0.11 | 1.81 | 0.21 | 0.031 | 1.53 | 0.25 | 98.51 |

Carbon dioxide was introduced to the pre-desiliconization mother liquor for carbonation decomposition, and the introduction was stopped when the solution pH was reduced to about 8.5. Upon a further filtration, silicic acid precipitate and a sodium carbonate solution were obtained. The silicic acid precipitate was subjected to hot-air drying under a temperature of 120° C. for 12 h to give 153 g dry silicon dioxide, wherein the amount of $Na_2O$ was 3.5%, the mass ratio of $SiO_2/Al_2O_3$ was 63.15, close to the composition of the pre-desiliconization mother liquor, and it could be used directly as major material for production of glass. Lime milk was added stoichiometrically to the sodium carbonate solution, and stirred under 60° C. to react for 5 h, and filtered to give a calcium carbonate precipitate and a sodium hydroxide solution. The calcium carbonate precipitate was subjected to hot-air drying under a temperature of 120° C. for 12 h to give 275 g dry calcium carbonate, wherein the amount of $Na_2O$ was 2.5wt %.

To meet the common glass formulation of 12-15 wt % of $Na_2O$, 8-13 wt % of CaO, and 69-73 wt % of $SiO_2$, in addition to all of the 153 g of the prepared dry silicon dioxide (approximately including 145.3 g of silicon dioxide, 2.3 g of aluminum oxide, and 5.4 g of sodium oxide) as well as 45 g of the dried calcium carbonate (approximately including 24.6 g of calcium oxide, and 1.1 g of sodium oxide), 36.4 g of sodium carbonate (equivalent to 21.3 g of sodium oxide) were needed. A glass formulation was obtained after the addition, with the composition of: 13.9 wt % of $Na_2O$ ($K_2O$), 12.3 wt % of CaO (MgO), 1.2 wt % of $Al_2O_3$ and 72.7 wt % of $SiO_2$. The formulation materials of the glass hereinabove totally amounted to 200 g.

A 300 ml crucible was placed in a high temperature muffle furnace, and increased to a temperature of 1300° C. The formulation materials of the glass added therein in three portions. After maintained at the temperature for 15 min, the temperature was increased to the clarification temperature of 1500° C., and maintained for 2 h. In the course of the maintaining, a stainless steel stick was used for stirring for several times to prevent thick bubbles, and enable homogenization of molten glass. A forming mould was placed on an electrical furnace to be preheated to 1000° C., a piece of 100 mm×100 mm×5 mm chunk glass resulting from cast moulding with a crucible was withdrawn and immediately transferred to a low temperature muffle furnace for annealing by maintaining at a temperature of 560° C. for about 30 min. Subsequently, the power was cut off after the temperature was reduced by 1° C. per minute to 200° C. The glass was naturally and slowly cooled to below 100° C. with the furnace, and withdrawn out of the fumace, and cooled in the transmittance with 3 mm in thickness was 93%, which also met and surpassed the standard of ultra-white glass (the visible light transmittance with 3 mm in thickness is 91.5%).

Example 2

The stages of obtaining coal ash residues by pre-desiliconization, and the preparation of silicon dioxide and calcium carbonate were completely same as those in Example 1.

All of the obtained coal ash residues were used, and the dried calcium carbonate precipitate was used, according to a molar ratio of $[CaO]/([SiO_2]+0.5[TiO_2])$ of 2, added with sufficient amount of calcium carbonate, and added with sodium carbonate according to a molar ratio of $[Na_2O]/([Al_2O_3]+[Fe_2O_3])$ of 1, mixed uniformly, and calcined under a temperature of 1200° C. for 3 h to give clinker. A formulation liquid was prepared, comprising 15 g/L $Na_2O_k$ (caustic alkali) and 5 g/L $Na_2O_c$ (alkali carbonate). The formulation fluid was withdrawn according to a liquid-solid ratio of 10:1, heated to 85° C., after adding therein said clinker, stirred and leached for 15 min, filtered to obtain a leaching liquid, followed by introducing therein carbon dioxide until the pH reached 8.5, to give an aluminum hydroxide precipitate. The aluminum hydroxide precipitate was filtered, dried with hot air under 120° C. for 3 h to remove the attached water from aluminum hydroxide, and further calcined under 1050° C. for 2 h to give 456.7 g aluminum oxide. The purity of aluminum oxide was 98.5%, and the aluminum extraction rate was 90.1% according to the formulation process of aluminum extraction of coal ash.

Example 3

The stages of obtaining coal ash residues by pre-desiliconization, and the preparation of silicon dioxide and calcium carbonate were completely same as those in Example 1.

All of the obtained coal ash residues were used, and the dried calcium carbonate precipitate was used, according to a molar ratio of $[CaO]/([SiO_2]+[TiO_2])$ of 1, added with sufficient amount of calcium carbonate, and added with sodium carbonate according to a molar ratio of $[Na_2O]/([Al_2O_3]+[Fe_2O_3]+[SiO_2])$ of 1, mixed uniformly, and calcined under a temperature of 1050° C. for 2 h to give clinker. A formulation liquid was prepared, comprising 15 g/L $Na_2O_k$ and 5 g/L $Na_2O_c$. The formulation fluid was withdrawn according to a liquid-solid ratio of 10:1, heated to 85° C., after adding therein said clinker, stirred and leached for 15 min, filtered to obtain a leaching liquid, followed by introducing therein carbon dioxide until the pH reached 8.3, to give an aluminum hydroxide precipitate. The aluminum hydroxide precipitate was filtered, dried with hot air under 120° C. for 3 h to remove the attached water from aluminum hydroxide, and further calcined under 1050° C. for 2 h to give 469.8 g aluminum oxide. The purity of aluminum oxide was 98.9%, and the aluminum extraction rate was 92.6% according to the formulation process of aluminum extraction of coal ash.

The terms and expressions used in this description are descriptive and nonrestrictive, which are not inclined to rule out any equivalent of the already indicated and described features or component parts.

Although several embodiments have been indicated and described by this invention, this invention shall not be limited to the described embodiments. On the contrary, the skilled artisan shall realize that any change or improvement can be made to these embodiments without deviating from the principles and essences of this invention. The protection scope of this invention is determined by the appended claims and equivalents thereof.

The invention claimed is:

1. A method for preparing a soda-lime-silica glass basic formulation, comprising the steps of:
    a1) pre-desiliconizing silicon-containing powdery industrial waste with a sodium hydroxide solution, and separating, to obtain a pre-desiliconization mother liquor and residues, wherein the mass concentration of sodium hydroxide in the sodium hydroxide solution is 10% to 50%, the mass ratio of silicon-containing powdery industrial waste to sodium hydroxide is 100:15 to 100:150 and the mass ratio of $SiO_2$ to $Al_2O$ in the pre-desiliconized mother liquor is greater than 6:1;
    a2) introducing carbon dioxide to the pre-desiliconization mother liquor for carbonation decomposition, and separating, to obtain a silicic acid precipitate and a sodium carbonate solution;
    a3) drying the silicic acid precipitate to obtain silicon dioxide;
    a4) adding lime milk into the sodium carbonate solution for causticization, and separating, to obtain a calcium carbonate precipitate and a sodium hydroxide solution;
    a5) drying the calcium carbonate precipitate; and
    a6) combining the silicon dioxide prepared in step a3), part of the dried calcium carbonate from step a5), and sodium oxide, to obtain a soda-lime-silica glass basic formulation.

2. The method according to claim 1, wherein said silicon-containing powdery industrial waste is selected from the group consisting of pulverized coal ash, unpulverized coal ash, stove ash, clay, kaolin, slag, red mud and combinations thereof.

3. The method according to claim 1, which further comprises at least one of the following steps:
    a1-1) subjecting the silicon-containing powdery industrial waste to magnetic separation, to remove iron prior to the step a1) pre-desiliconization;
    a4-1) recovering the sodium hydroxide solution obtained in step a4), and using it in the pre-desiliconization of the silicon-containing powdery industrial waste in step a1);
    a5-1) calcining part of the dried calcium carbonate precipitate from step a5), preparing lime milk, and adding the lime milk to the filtered sodium carbonate for causticization in step a4); and
    a5-2) recovering carbon dioxide obtained by calcining the calcium carbonate precipitate and introducing the carbon dioxide to the pre-desiliconization mother liquor for the carbonation decomposition in step a2).

4. The method according to claim 1, wherein said silicon-containing powdery industrial waste is coal ash.

5. The method according to claim 4, wherein, in step a1), the reaction temperature is between 60° C. and 150° C. and the reaction time lasts for 0.5 h to 10 h.

6. The method according to claim 5, wherein, in step a1), the mass concentration of sodium hydroxide in the solution is 15% to 35%, the mass ratio of coal ash to sodium hydroxide is 100:30 to 100:90, the reaction temperature is 70° C. to 130° C., and the reaction time lasts for 1 h to 4 h.

7. The method according to claim 1, wherein, in step a6), the silicon dioxide and calcium carbonate obtained respectively in steps a3) and a5) comprise 70% to 95% by weight of the soda-lime-silica glass basic formulation.

8. A method for producing soda-lime-silica glass comprising:
    a7) adding one or more of potassium oxide, aluminum oxide, magnesium oxide, clarifying agent, oxidant, reducing agent, colorant, decolorant, emulsifier, or cosolvent to the soda-lime-silica glass basic formulation of claim 1; and
    a8) performing glass melting, forming, and annealing.

9. The method according to claim 8, further comprising a step of reprocessing to obtain a glass product.

10. The method according to claim 8, wherein, said forming process is a pressing process, a blowing process, a drawing process, a rolling process, casting forming, or float forming.

11. A method for extracting aluminum from coal ash for co-production of glass, comprising the steps of:
    b1) pre-desiliconizing coal ash with a sodium hydroxide solution, and separating, to obtain a pre-desiliconization mother liquor and residues;
    b2) introducing carbon dioxide to the pre-desiliconization mother liquor for carbonation decomposition, and separating, to obtain a silicic acid precipitate and a sodium carbonate solution;
    b3) drying the silicic acid precipitate to obtain silicon dioxide;
    b4) adding lime milk into the sodium carbonate solution for causticization, and separating, to obtain a calcium carbonate precipitate and a sodium hydroxide solution;
    b5) drying the calcium carbonate precipitate;
    b6) combining the silicon dioxide prepared in step b3), part of the dried calcium carbonate from step b5), and sodium oxide, to obtain a soda-lime-silica glass basic formulation; and
    b7) performing aluminum extraction by using the resulting residues obtained in step b1).

12. The method according to claim 11, further comprising:
    b8) adding one or more of potassium oxide, aluminum oxide, magnesium oxide, clarifying agent, oxidant, reducing agent, colorant, decolorant, emulsifier, or cosolvent to the soda-lime-silica glass basic formulation from step b6); and
    b9) performing glass melting, forming, annealing, and reprocessing to obtain a glass product.

13. The method according to claim 11, which further comprises at least one of the following steps:
    b1-1) subjecting the coal ash to magnetic separation, to remove iron prior to the step b1) pre-desiliconization;

b4-1) recovering the sodium hydroxide solution obtained in step b4), and using it in the pre-desiliconization of the coal ash in step b1);

b5-1) calcining part of the dried calcium carbonate precipitate from step b5), preparing lime milk, and adding the lime milk to the filtered sodium carbonate for causticization in step b4); and b5-2) recovering carbon dioxide obtained by calcining the calcium carbonate precipitate and introducing the carbon dioxide to the pre-desiliconization mother liquor for the carbonation decomposition in step b2).

14. The method according to claim 11, wherein, in step b1), the mass concentration of sodium hydroxide in the solution is 10% to 50%, the mass ratio of coal ash to sodium hydroxide is 100:15 to 100:150, the reaction temperature is between 60° C. and 150° C., and the reaction time lasts for 0.5 h to 10 h.

15. The method according to claim 14, wherein, in step b1), the mass concentration of sodium hydroxide in the solution is 15% to 35%, the mass ratio of coal ash to sodium hydroxide is 100:30 to 100:90, the reaction temperature is between 70° C. and 130° C., and the reaction time lasts for 1 h to 4 h.

16. The method according to claim 14, wherein, in step b1), the mass ratio of $SiO_2$ to $Al_2O_3$ in the resulting pre-desiliconized mother liquor is greater than 6:1.

17. The method according to claim 11, wherein, in step b6), the silicon dioxide and calcium carbonate obtained respectively in steps b3) and b5) comprise 70% to 95% by weight of the soda-lime-silica glass basic formulation.

18. The method according to claim 12, wherein said forming process is a pressing process, a blowing process, a drawing process, a rolling process, casting forming, or float forming.

19. The method according to claim 11, which further comprises:

b5-3) mixing at least part of the dried calcium carbonate precipitate from step b5) directly with the residues obtained from step b1), followed by soda lime sintering to prepare clinker for aluminum extraction; and/or b5-4) calcining part of the dried calcium carbonate precipitate from step b5) at first to obtain lime, which is then mixed with the residues obtained from step b1), followed by soda lime sintering to prepare clinker for aluminum extraction.

20. The method according to claim 19, wherein the mixing of the materials during the process of soda lime sintering ensures a molar ratio of $[CaO]/([SiO_2]+x[TiO_2])$ between 0.8 and 2.2, wherein $0.5<x<1.0$; and a molar ratio of $[Na_2O]/([Al_2O_3]\pm[Fe_2O_3]+y[SiO_2])$ between 0.8 and 1.2, wherein $0<y21$ 1.0.

21. The method according to claim 19, wherein the soda lime sintering to prepare clinker is carried out by calcination at a temperature between 800 and 1500° C.

* * * * *